United States Patent [19]

Moore

[11] 3,883,002
[45] May 13, 1975

[54] BICYCLE RACK
[76] Inventor: Myron C. Moore, 700 Tanglewood, Dunedin, Fla. 33520
[22] Filed: Jan. 28, 1974
[21] Appl. No.: 437,476

[52] U.S. Cl. .................................. 211/18; 211/21
[51] Int. Cl. ............................................. B62h 3/08
[58] Field of Search ............... 211/5, 17, 18, 19, 20, 211/21, 22, 23, 24; 108/80, 82; 70/233, 234, 235; 248/291; 403/61, 111

[56] References Cited
UNITED STATES PATENTS

| 188,414 | 3/1877 | Rohde | 108/80 |
| 639,991 | 12/1899 | Jewell | 211/20 X |
| 2,460,945 | 2/1949 | Nighthart | 211/22 |
| 3,770,133 | 11/1973 | Kolker | 211/19 |

FOREIGN PATENTS OR APPLICATIONS

| 360,163 | 11/1931 | United Kingdom | 211/18 |
| 19,513 | 7/1899 | United Kingdom | 211/17 |
| 18,763 | 1/1903 | United Kingdom | |
| 234,593 | 6/1925 | United Kingdom | 211/18 |
| 66,833 | 12/1945 | Denmark | 211/20 |
| 444,898 | 6/1927 | Germany | 211/22 |
| 18,355 | 10/1899 | United Kingdom | 211/18 |
| 1,790 | 12/1898 | United Kingdom | 211/18 |

Primary Examiner—Roy D. Frazier
Assistant Examiner—Thomas J. Holko
Attorney, Agent, or Firm—Robert F. Ruemeli

[57] ABSTRACT

A bicycle rack has a channel-shaped track for receiving the bicycle wheels, and is mounted on a wall or other supporting member for movement between an elevated, storage position, and an inclined position with a free end of the track engaging the floor or other surface, for wheeling the bicycle onto and off of the track. A pair of diagonal braces receive a wheel of the bicycle to retain the bicycle generally upright on the track, and form part of a latch for retaining the track in its storage position. The track is preferably mounted so that it may be swung about a vertical axis from a position generally parallel to an adjacent rear wall when in the storage position, to a position swung outwardly from the rear wall for wheeling the bicycle onto and off of the rack. A wheel latch releasably secures one of the wheels against movement along the track.

6 Claims, 6 Drawing Figures

PATENTED MAY 13 1975   3,883,002

BICYCLE RACK

This invention relates to a bicycle rack and, more particularly, to such a rack which may be moved between a storage position and a position for wheeling a bicycle onto and off of the rack.

BACKGROUND OF THE INVENTION

With the renewed interest in bicycling during the last few years, storage of bicycles has become a problem. For example, a family may have four or five bicycles which require considerable storage room in a garage or other storage area.

Similar storage problems were encountered years ago, as indicated by a patent granted in 1899, U.S. Pat. No. 639,991, in which bicycles were stored one above the other on racks. Devices for holding one of the bicycle wheels against movement along a channel shaped supporting track are also shown in this patent. However, no provision is made for wheeling the bicycles onto the elevated tracks, although the elevated tracks may be partially collapsed when not in use.

Another patent of interest, granted in 1932, Austrian Pat. No. 127,880, also shows upper and lower storage racks for bicycles. The upper racks are pivoted intermediate their ends for swinging movement to an inclined position for aiding in loading a bicycle onto a rack. However, the upper racks are not constructed to engage the floor or other supporting surface so that the bicycle can be conveniently wheeled onto the rack. Additionally, the upper racks are maintained in a generally horizontal storage position by engagement of one end of the rack with a vertical supporting member.

The bicycle rack of this invention is of a type particularly suited for use as an elevated rack, generally in the environment shown in the two previously noted patents. Other patents of general interest include U.S. Pat. No. 418,829 and U.S. Pat. No. 567,625, and a British Pat. No. 18,763, dated 1902.

THE INVENTION, IN BRIEF

The invention, in brief, is directed to a bicycle rack having a track for receiving the bicycle wheels and mounted at one end for swinging movement between an elevated storage position, and an inclined position with an opposite end of the track adapted to engage the floor or other supporting surface, to facilitate wheeling of the bicycle onto and off of the rack. The rack may be swung from a storage position generally parallel to an adjacent wall, for more compactly storing the bicycle, to a position swung outwardly from the wall to facilitate moving the bicycle onto and off of the rack. A pair of diagonal braces receive a wheel of the bicycle for retaining it in an upright position on the track, and in cooperation with the track provide a latch for releasably retaining the track in its storage position. A wheel latch on the track releasably engages one of the bicycle wheels for retaining the bicycle against movement along the track.

It is a primary object of this invention to provide a new and useful bicycle rack or support.

Another object is provision of a new and useful bicycle rack or support having a track for holding the wheels of the bicycle, the track being mounted on a support for generally vertical movement between a storage position and an inclined position for moving the bicycle onto and off of the track, with a member secured to the support and to the track, for releasably holding the track in its storage position. A related object is provision of an end portion of the track mounted on the support for movement between the storage and inclined positions. Another related object is provision for mounting the track to swing about a generally vertical axis. A further related object includes provision for retaining the track in its storage position by means of a slide and a latch, one on the aforesaid member and the other on the track. A still further related object includes the aforesaid member in the form of a pair of diagonal braces secured to the support and to the track and disposed for receiving a wheel of the bicycle to retain the bicycle in a substantially upright position on the track. Still another related object includes provision of a latch for releasably retaining a wheel of the bicycle against appreciable movement along the track.

Still another object is provision of a new and useful rack which may swing out from wall storage position to allow access and use of the wall for hanging tools and for storage of other items. Additionally, by elevating the rack another bicycle may be stored on the floor under the rack.

A further object is provision of a new and useful bicycle rack which is durable and inexpensive in construction, as well as being convenient to use.

These and other objects and advantages of the invention will be apparent from the following description and the accompanying drawing.

Figures 1, 2, 3, 4, 5, 6:
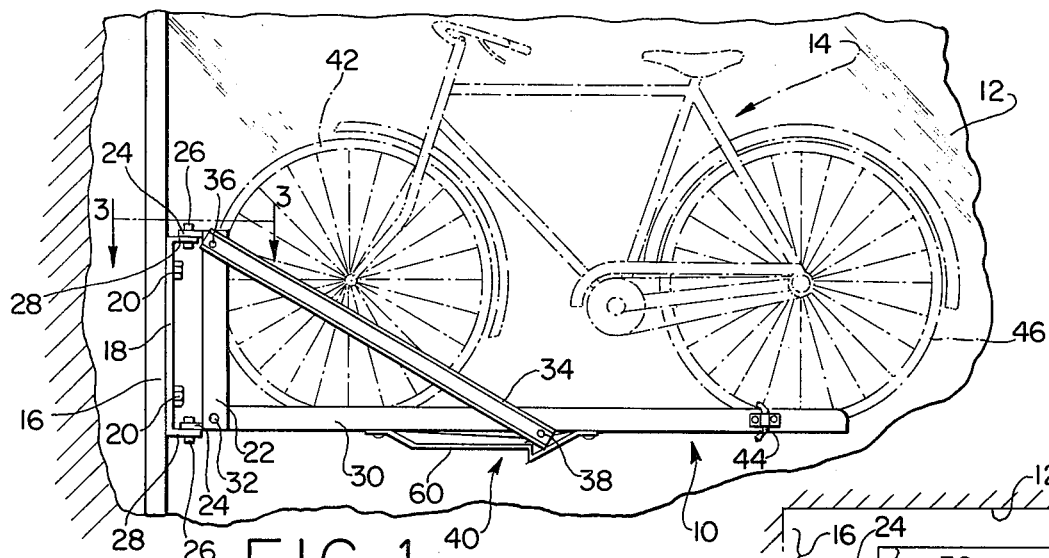
FIG. 1 is a fragmentary view of a preferred embodiment of the bicycle support mounted on a side wall and shown in its elevated, bicycle storage position, generally parallel to a rear wall, with a bicycle on the support shown in the phantom lines.
FIG. 2 is an enlarged, fragmentary, elevational view of the bicycle support shown in solid lines in the storage position, and in phantom lines in a lowered position, with parts broken away and removed for clearer illustration.
FIG. 3 is an enlarged, rack provide a latch for releasably retaining the track in its storage position. A wheel latch on the track releasably engages one of the bicycle wheels for retaining the bicycle against movement along the track.

It is a primary object of this invention to provide a new and useful bicycle rack or support.

Another object is provision of a new and useful bicycle rack or support having a track for holding the wheels of the bicycle, the track being mounted on a support for generally vertical movement between a storage position and an inclined position for moving the bicycle onto and off of the track, with a member secured to the support and to the track, for releasably holding the track in its storage position. A related object is provision of an end portion of the track mounted on the support for movement between the storage and inclined positions. Another related object is provision for mounting the track to swing about a generally vertical axis. A further related object includes provision for retaining the track in its storage position by means of a slide and a latch, one on the aforesaid member and the other on the track. A still further related object includes the aforesaid member in the form of a pair of diagonal braces secured to the support and to the track and disposed for receiving a wheel of the bicycle to retain the bicycle in a substantially upright position on the track. Still another related object includes provision of a latch for releasably retaining a wheel of the bicycle against appreciable movement along the track.

Still another object is provision of a new and useful rack which may swing out from wall storage position to allow access and use of the wall for hanging tools and for storage of other items. Additionally, by elevating the rack another bicycle may be stored on the floor under the rack.

A further object is provision of a new and useful bicycle rack which is durable and inexpensive in construction, as well as being convenient to use.

These and other objects and advantages of the invention will be apparent from the following description and the accompanying drawing.

BRIEF DESCRIPTION OF THE DRAWING

FIG. 1 is a fragmentary view of a preferred embodiment of the bicycle support mounted on a side wall and shown in its elevated, bicycle storage position, generally parallel to a rear wall, with a bicycle on the support shown in the phantom lines;

FIG. 2 is an enlarged, fragmentary, elevational view of the bicycle support shown in solid lines in the storage position, and in phantom lines in a lowered position, with parts broken away and removed for clearer illustration;

FIG. 3 is an enlarged, fragmentary, sectional plan view taken generally along the line 3—3 in FIG. 1, with parts broken away and removed for clearer illustration;

FIG. 4 is a sectional view similar to FIG. 3 but with the support swung outwardly from the rear wall, to facilitate wheeling the bicycle onto or off of the support;

FIG. 5 is an enlarged, fragmentary, elevational view of a wheel latch holding the rear wheel of the bicycle, as shwon in FIG. 1, and shown in phantom lines in its released position; and FIG. 6 is a fragmentary plan view of the latch shown in FIG. 5.

DESCRIPTION OF THE ILLUSTRATED EMBODIMENT

Referring to the drawing, FIG. 1 shows the bicycle rack or support 10 in an elevated, storage position swung generally parallel to a rear wall 12 or convenient storage of a bicycle 14. The support 10 may be mounted in any suitable manner, and as illustrated is secured to a side wall 16 which is generally perpendicular to the rear wall 12. A mounting bracket 18 of the bicycle support is suitably secured to the face of the wall 16 by a pair of screws or bolts 20. The mounting bracket may be supported in any suitable manner. For example, may be supported on a column or a post, if desired. A mounting member of the rack 10 is in the form of a vertical channel 22 (FIG. 3) having opposed ears 24 bent outwardly from the bight of the channel with each ear provided with a hole for receiving a generally vertical pivot pin 26 passing through a hole in an adjacent ear 28 of the mounting bracket 18. The bracket 18 and channel 22 provide a support for a channel-shaped track 30 received between the opposite legs of the channel 22 and pivoted thereto by a pivot pin 32 extending through the legs of the channel 22 and the track 30.

A member in the form of a pair of braces 34 (FIGS. 3 and 4) are channel-shaped and are secured to the top end of the channel 22 by a pivot pin 36 extending through the bight of the braces 34 and through the legs of the channel 22. Lower ends of the braces 34 receive a slide in the form of a pin 38 which forms part of a latch 40 for releasably retaining the rack in its elevated, storage position, as will be described later. In addition to supporting the track 30 and the bicycle 14, the braces 34 provide side retainers for the front wheel 42 of the bicycle, and the channel 22 further serves this capacity, to retain the bicycle generally upright on the track 30. In order to retain the bicyle 14 against horizontal movement, a wheel latch 44 (FIGS. 5 and 6) is provided for releaseably holding the rear wheel 46 of the bicycle. The latch 44 will be described later.

The track retaining latch 40 (FIG. 2) includes the slide or pin 38 which interconnects the braces 34 and extends under the track 30. In the elevated, storage position of the track 30, the pin 38 seats against the bottom of the track and against a shoulder 46 on a wedge-shaped first guide 48 secured in any suitable manner (not shown) to the bottom face of the track 30. A spring 50, preferably a steel leaf spring, urges the pin 38 into its holding position and retains the pin in latched position should the track be jarred upwardly. A lower guide 52 is suitably secured at either end to the track 30, as by rivets 54, the rear rivet 54 also retaining the spring 50 in place.

In order to lower the track 30 and the bicycle 14 from its elevated, storage position, the track 30 is moved slightly upwardly to deflect the spring 50 downwardly so that the pin 38 is below a lower face 56 of the wedge-shaped guide 48, whereupon the lower ends of the braces 34 and the pin 38 may be swung toward the left so that the pin rides along the bottom face 56 of the wedge-shaped guide 48 as the track is lowered until its free or right end is seated on the floor, as shown by phantom lines in FIG. 2. When it is again desired to raise the track 30 to its elevated, storage position, the track is merely swung upwardly whereupon the latch pin 38 will ride between the wedge-shaped guide 48 and an upper face 60 of the lower guide 52 until the latch pin 38 engages the leaf spring 50, whereupon the pin rides along the upper face of the spring and into the latched position shown by solid lines in FIG. 2.

Before or during lowering of the track 30, the track and the bicycle 14 may be swung outwardly and away from the rear wall 12 by pivoting the track and therewith the mounting member 20 about the pivot pins 26.

The rear wheel latch 44 is shown by solid lines in its retaining position in FIGS. 5 and 6, and in its released position by phantom lines. Latch 44 includes a generally vertical shank 62 pivotally secured against a leg of the channel-shaped track 30 by means of a bracket 64 secured to the channel as by bolts 66 received in threaded holes in the track. An upper arm 68 and a lower arm 70 are intergral with the shank 62 and are generally coplanar and extend in the same general direction and at approximately 45° to the shank. Outer ends of the arms 68 and 70 carrying integral, generally horizontal fingers 72 and 74, respectively. In the wheel retaining position, as shown by solid lines in FIGS. 5 and 6, the arms 68 and 70 seat against the outer face of the track 30 to prevent further clockwise movement of the arms, with the upper finger 72 received above the track 30 and above the inner face of the rim of the rear wheel 46. The lower finger 74 is received below the lower face of the track 30. In order to move the bicycle onto or off of the track 30, the latch 44 is swung counter-clockwise from the retaining position, to the releasing position as shown by phantom lines. In the releasing position, the angularly disposed arms 68 and 70 retain the latch against further counter-clockwise movement.

While this invention has been described with reference to a particular embodiment in a particular environment, various changes may be apparent to one skilled in the art and the invention is therefore not to be limited to such embodiment or environment, except as set forth in the appended claims.

What is claimed is:

1. A bicycle support comprising, a track for holding the wheels of the bicycle, a support for the track, means mounting an end portion of the track on the track support for generally vertical movement between a storage position and a position inclined downwardly from the track support for moving the bicycle onto and off of the track, means including a member secured to a portion of the track support above the mounting means and to an intermediate portion of the track for engaging a wheel of the bicycle and retaining the bicycle in a generally vertical position on the track, and cooperating latch means on the member and the track releasably holding the track in its storage position.

2. A support as set forth in claim 1 in which the mounting means further mounts the track for swinging movement about a generally vertical axis.

3. A support as set forth in claim 1 including latch means for releasably retaining a wheel of the bicycle against substantial movement along the track.

4. A support as set forth in claim 1 in which the member includes a pair of braces, one adjacent each of opposite sides of the track, for receiving a wheel of the bicycle therebetween and retaining the bicycle in a generally vertical position on the track.

5. A support as set forth in claim 4 in which the cooperating latch means includes a slide connecting opposite end portions of the braces adjacent the track, and further including a latch mounted on the track, the latch including a guide portion for movement on the slide back and forth along the track as the track is moved between its inclined and storage positions, and the latch further including a retaining portion releasably retaining the slide substantially fixed relative to the track in the storage position.

6. A support as set forth in claim 5 in which the track is channel-shaped, the guide portion includes a generally wedge-shaped portion secured to a lower face of the track and having a shoulder at an end farthest from the support, the slide abutting the shoulder when the track is in its storage position, and the guide portion further including a lower guide portion spaced from the wedge-shaped portion for movement of the slide therebetween, and a leaf spring having one end secured to the track and a free end adjacent the slide and below the shoulder for urging the slide against the shoulder, a wheel latch proximate a free end portion of the track for engaging a wheel of the bicycle and releasably retaining the wheel on the track and including, a generally vertical shank pivotally mounted on a side of the track, a pair of generally coplanar arms, one extending from each of opposite ends of the shank, and in the same generally direction for engaging the side of the track, and a finger transverse to an upper one of the arms for overlying a rim of the wheel to retain the wheel on the track, whereby the finger may be swung outwardly from the wheel to release the wheel, and in which the mounting means further mounts the track for swinging movement about a generally vertical axis.

* * * * *

UNITED STATES PATENT OFFICE
CERTIFICATE OF CORRECTION

Patent No. ~~~~~~~~~~~~~~~ Dated May 13, 1975

Inventor(s) ~~~~~~~~~~~~~~~

It is certified that error appears in the above-identified patent and that said Letters Patent are hereby corrected as shown below:

Column 1, line 60 through Column 2, line 45 should be deleted.

[SEAL]

Signed and Sealed this nineteenth Day of August 1975

Attest:

RUTH C. MASON
*Attesting Officer*

C. MARSHALL DANN
*Commissioner of Patents and Trademarks*